(12) United States Patent
Thomas et al.

(10) Patent No.: US 9,424,448 B2
(45) Date of Patent: Aug. 23, 2016

(54) LOCATING DEVICE FOR EVALUATING THE DISTANCE BETWEEN AN RFID LABEL AND AN INTERFACE

(71) Applicant: Commissariat à l'énergie atomique et aux énergies alternatives, Paris (FR)

(72) Inventors: Thierry Thomas, Varces Allieres et Risset (FR); François Frassati, Voreppe (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 166 days.

(21) Appl. No.: 14/383,692

(22) PCT Filed: Mar. 6, 2013

(86) PCT No.: PCT/EP2013/054534
§ 371 (c)(1),
(2) Date: Sep. 8, 2014

(87) PCT Pub. No.: WO2013/131975
PCT Pub. Date: Sep. 12, 2013

(65) Prior Publication Data
US 2015/0054623 A1     Feb. 26, 2015

(30) Foreign Application Priority Data

Mar. 7, 2012   (FR) ...................................... 12 52081

(51) Int. Cl.
*H04Q 5/22*   (2006.01)
*G06K 7/10*   (2006.01)
*G01V 15/00*  (2006.01)

(52) U.S. Cl.
CPC ............ *G06K 7/10128* (2013.01); *G01V 15/00* (2013.01); *G06K 7/10336* (2013.01)

(58) Field of Classification Search
CPC ... G06K 7/0008; G06K 7/08; G06K 7/10128; H04B 5/0062; H04B 5/00
USPC .............. 340/10.1, 13.26, 12.51, 505, 539.21
See application file for complete search history.

(56) References Cited

U.S. PATENT DOCUMENTS

| | | | |
|---|---|---|---|
| 6,097,189 A * | 8/2000 | Arndt ...................... | G01S 7/352 324/326 |
| 2007/0290846 A1 | 12/2007 | Schilling et al. | |
| 2008/0150693 A1 * | 6/2008 | You ...................... | G06K 7/0008 340/10.1 |
| 2011/0181289 A1 | 7/2011 | Rushing | |

FOREIGN PATENT DOCUMENTS

FR   2961354    12/2011
JP   2005 181111   7/2005

* cited by examiner

*Primary Examiner* — Vernal Brown
(74) *Attorney, Agent, or Firm* — Occhiuti & Rohlicek LLP

(57) ABSTRACT

A locating device for determining a distance of an RFID tag with respect to an interface between two media comprising an inductive coupling antenna and a sensor for determining a distance between the antenna and the interface. There is an energizing circuit configured to energize the antenna to generate an electromagnetic field with various successive amplitude values and a detection device for detecting an electromagnetic field response from the RFID tag. There is a processing circuit configured to determine several pairs of information, each pair including: a distance between the antenna and the interface and a minimum electromagnetic field value detected by the detection device from the RFID tag at the determined distance between the antenna and the interface. The processing circuit also evaluates the distance between the RFID tag and the interface as a function of the several pairs.

17 Claims, 2 Drawing Sheets

LOCATING DEVICE FOR EVALUATING THE DISTANCE BETWEEN AN RFID LABEL AND AN INTERFACE

RELATED APPLICATIONS

Under 35 USC 371, this application is the national stage of PCT/EP2013/054534, filed on Mar. 6, 2013, which claims the benefit of the Mar. 7, 2012 filing date of French Application 1252081, the contents of which are herein incorporated by reference.

FIELD OF INVENTION

The invention relates to the locating of buried, submerged or inaccessible objects, and in particular to the locating of objects by activating tags of RFID type attached to these objects. The invention turns out to be more particularly advantageous for the locating of plastic pipes.

BACKGROUND

Location of buried or submerged objects is often tricky for persons situated at the surface. Such location turns out to be necessary in particular with a view to carrying out works, either to access water pipes or gas pipes, or to avoid harming them, or to update network plans. Location based solely on plans made when positioning the pipes usually turns out to be unusable on account of a lack of reliability of the plans, on account of loss of these plans, or on account of an uncontrolled displacement of the pipes (for example subsequent to terrain movements or earthworks).

On account of the absence of direct access to such pipes, a certain number of procedures have been fine-tuned to facilitate their effective location from the surface. A known location procedure consists in particular in fixing RFID tags to pipes at strategic sites beforehand, and then in subsequently locating these tags from the surface by using a reader associated with these tags.

By determining the horizontal position and the depth of the various tags, it is in particular possible to reconstruct in three dimensions an underground network of pipes. The presence of tags at singular points of the network (for example at the level of the pipe branchings or bends) facilitates the reconstruction of its plan.

Several modes of communication are known between a reader and an RFID tag. In such systems, a link is established by radiofrequency magnetic field between the reader and one or more tags.

High frequency and ultra high frequency radiating antenna type antennas, whose size is of the order of half the wavelength of the communication frequency, are sensitive both to the magnetic field component and to the electric field component. Communication between the reader and the tag is very dependent on the structure of the antennas of the tag and of the reader. Moreover, having regard to the distances involved of greater than the wavelength of the electromagnetic field and of the electromagnetic characteristics of the medium in which the tag is buried, the ultra high frequencies lead to electromagnetic field pattern diagrams that are more complex and more liable to be disturbed. The moisture of the medium furthermore induces increased absorption of the waves. Reliability of location is thus seriously affected.

On account of these limitations, the use of inductive type antennas is favored for such applications. The communication between a reader and RFID tags is for example defined in the standards ISO15693 and ISO18000-3 for the frequency of 13.56 MHz.

In the case of inductive antennas, the interactions between the antenna of the reader and the antenna of the tag can be described by equations of inductive coupling (with a quasi-static approach and the use of the calculation of mutual inductances). The inductive coupling induces the transfer of energy between the reader and the tag by mutual inductance.

Across its surface, a coiled conducting circuit of the tag taps off the flux of the magnetic field produced by the antenna of the reader. The temporal variation of this flux creates an induced voltage termed the e.m.f (for electromotive force) within this coiled circuit. This voltage is rectified and generally used to power the functions of the tag.

The coiled circuit of the antenna exhibits an inductance. This inductance is exploited by associating it with a capacitive element added to form a parallel resonator. The voltage available across the terminals of this resonator is then the product of the voltage induced by the overvoltage coefficient (corresponding overall to the coefficient of quality of the resonator) thus allowing the energizing of an integrated circuit of the tag. The remote energizing of an integrated circuit of an RFID identification tag requires a minimum voltage (and power) to operate, typically of the order of a few volts peak and a few hundred microwatts. There thus exists a minimum magnetic field value applied to the antenna of the tag upward of which the tag is functional and can respond to the demands of the reader.

To allow the transmission of data from the tag to the reader, the tag modifies the impedance that it exhibits across the terminals of the antenna circuit. This variation of impedance is detected by the reader on account of the inductive coupling.

A certain number of detection methods are known, in which an operative uses an RFID reader to obtain the location of underground RFID tags.

Detection zone is intended to mean the volume (or by extension the ground surface area) in which an RFID tag is readable by the reader. Communication with the tag is possible if the center of the antenna of the reader is inside the volume and impossible if the center of the antenna is outside this volume. The geometry of the detection zone (shape and dimension) depends on the characteristics of the tag (positioning and sensitivity) and the characteristics of the antenna of the reader, as well as the magnetic field level produced by this antenna.

In patent JP2005181111, RFID tags are fixed on buried pipes. The reader, when it is situated in the detection zone, locates the tag by communicating with the latter. Accordingly, the reader recovers an item of depth information that was stored beforehand in the tag. The reader determines the horizontal positioning of the tag in an approximate manner, based on the fact that the reader is disposed in the detection zone.

Such a method of location turns out to be relatively inaccurate as regards horizontal positioning and does not make it possible to determine the effective depth of the tag. Thus, the item of depth information recovered turns out to be imprecise in the case of a reworking of the surface of the ground or of a displacement of the pipe under the effect of various events, such a variation turning out to be relatively probable for pipes whose lifetime is frequently between 30 and 50 years.

Another known method of location is based on communication between a reader and a low-frequency (between 80 and 120 kHz) RFID tag and the use of inductive type antennas are favored for such applications. The low frequencies correspond to wavelengths that are much greater than the location distances. Such a method is frequently implemented with tags furnished with simple resonators and devoid of electronic chips. The resonator of the tag creates a secondary magnetic field proportional to the primary magnetic field created by the antenna of the reader.

The growth and the decay of the amplitude of the secondary field occur according to a time constant dependent on the quality factor of the resonator. The secondary-field amplitude measured by the reader is relatively low with respect to the amplitude of the primary field. In order to allow measurement of the secondary field, the primary field is emitted only briefly and the measurement of the secondary field is performed during the periods of extinction of the primary field. In order for the amplitude of the secondary field to still be appreciable for a sufficiently long time during the periods of extinction of the primary field, the resonator of the tag exhibits a sufficiently high quality factor (typically between 50 and 100).

The horizontal position or the plumb alignment of the tag is determined by scanning the surface of the ground with the reader. The horizontal position of the tag is identified when the amplitude of the secondary field attains a maximum.

Since tags furnished with a simple resonator are not able to advise the reader as to their configuration, the reader must furthermore solve a problem with two unknowns: the intensity of emission of the secondary magnetic field and the depth of the tag. To determine these two unknowns, the operative places the reader plumb with the tag, and performs two measurements at two predefined heights above the ground.

In order to guarantee the accuracy of measurement of the secondary field, the latter is measured in a repeated manner and an average is calculated over the various measured values. However, on account of the low communication frequency values used, the duration required to carry out the secondary-field measurements turns out in practice to be relatively long for the operator, typically several seconds. Once plumb with the tag, this duration of measurement is doubled in order to measure the secondary field at the two predefined heights. So as not to render location excessively lengthy, the determination of the plumb alignment of the tag must also be carried out by making do with an approximate location of the place for which the secondary field provides a maximum amplitude. Moreover, the accuracy of such a method turns out to be relatively dependent on the external magnetic disturbances in nearby frequencies (for example due to the excitation of other secondary sources), the secondary-field amplitude measured on the reader remaining very small.

SUMMARY OF INVENTION

The invention is aimed at solving one or more of the drawbacks of the prior art. The invention thus pertains to a locating device evaluating a distance of an RFID tag with respect to an interface between two media, the tag being disposed on the side opposite from the locating device with respect to the interface. The device is defined in the appended claims.

The invention also pertains to a method for locating an RFID tag with respect to an interface between two media, the tag being disposed on the side opposite from a locating device with respect to the interface, defined in the appended claims.

Other characteristics and advantages of the invention will emerge clearly from the description thereof given hereinafter, by way of wholly nonlimiting indication, with reference to the appended drawings.

DETAILED DESCRIPTION

The location of a tag according to the invention is based on the determination of various minimum values of electromagnetic field for detecting the tag, as a function of various positions of a locating device generating this electromagnetic field.

The invention provides a solution for locating RFID tags exhibiting high accuracy together with easy manipulation. This location may be independent of the evolution of the performance of the tag, for example related to its aging.

This location solution is sufficiently discriminating with respect to other sources of secondary field or other possible RFID tags. Furthermore, this solution is particularly easy to implement for operatives under real conditions. Moreover, the invention makes it possible to carry out location even in the presence of ground obstacles inducing a relatively restricted space to carry out measurements.

The description will subsequently describe horizontal location of a tag followed by the location of its depth with respect to a horizontal surface. However, the invention also applies to the evaluation of the distance between a tag and a non-horizontal interface. The interface ensures separation between two media, the tag and a device being disposed on either side of the interface. The locating device described subsequently thus exhibits:
 a function for determining position with respect to a substantially plane interface, in projection on this interface along its normal;
 a function for evaluating the distance between the tag and the interface.

Figure 1:
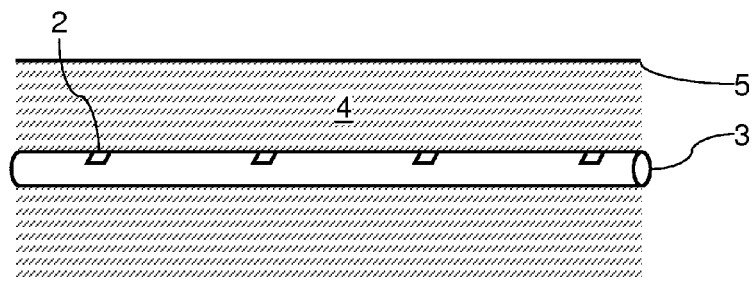
FIG. 1 is a schematic representation of an underground pipe that needs to be located, furnished with RFID tags.

The invention can typically be applied to the location of underground pipes. FIG. 1 illustrates in a schematic manner an underground pipe 3 buried in an underground medium 4, such as earth. The upper surface of the earth 4 forms an interface 5 between two media, in this instance of different natures, namely the earth 4 and the air. RFID transponders or tags 2 are fixed in appropriate places on the pipe 3, for example at regular intervals, at the level of branches or elbows made in the pipe 3. For such an application, tags 2 able to operate under earth or in a moist medium will be used.

Figure 2:
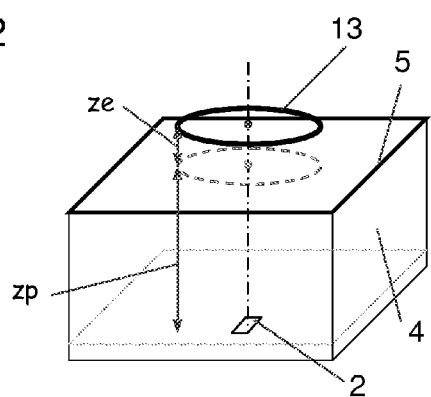
FIG. 2 is a schematic representation of a phase of location of an RFID tag and of various parameters involved.

FIG. 2 represents the positioning of an antenna 13 of a device for the location of the tag 2 buried in the ground 4. The antenna 13 is here located plumb with the tag 2. ze corresponds to the distance between the antenna 13 and the ground 5, while zp corresponds to the distance between the ground 5 and the tag 2. The locating device described subsequently is in particular aimed at evaluating this distance zp and/or the position of plumb alignment of the tag 2.

The location of a tag according to the invention is based on the determination of various minimum values of electromagnetic field for detecting the tag, as a function of various positions of the antenna of the locating device generating this electromagnetic field.

The locating device according to an embodiment of the invention includes a device for detecting a response from the tag 2. In this embodiment, the detecting device is implemented in the form of an RFID reader 1.

Figure 3:
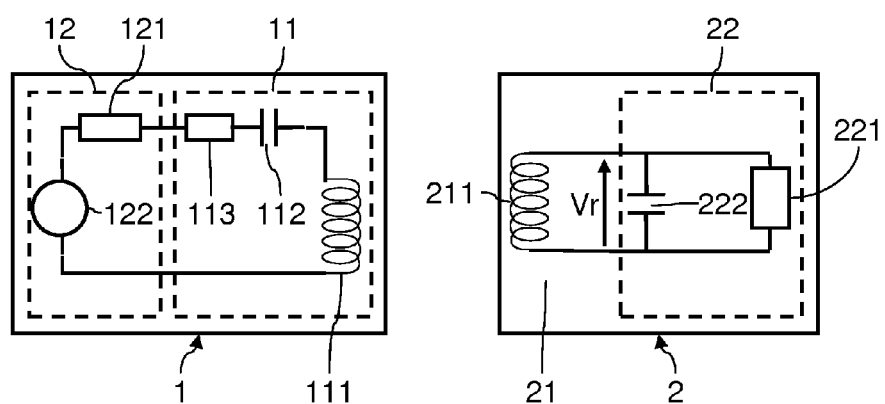
FIG. 3 is an equivalent electrical representation of the association of a reader and of an RFID tag both of inductive type implemented in an embodiment of a locating device according to the invention.

FIG. 3 provides a schematic example of the conventional electrical representation of the reader 1 and of the inductive-coupling contactless RFID tag 2 that it is desired to locate.

On the RFID reader 1 side, the antenna circuit 11 can be modeled by an equivalent antenna inductor 111, in series with a resistor 113 and a capacitor 112. The antenna circuit 11 is connected to an electronic circuit 12 of the reader 1. The output impedance of the RFID reader 1 can be modeled by a resistor 121, connected in series with the antenna circuit 11 and a power supply 122.

On the tag 2 side, the antenna circuit 21 can be modeled by an equivalent inductor 211. The antenna circuit 21 is connected to an electronic circuit 22. The electronic circuit 22 contains a capacitor 222. The electrical consumption of this electronic circuit can be modeled by a resistor 221 connected in parallel with the equivalent inductor 211.

The inductive coupling induces the transfer of energy between the reader and the tag by mutual inductance. An alternating voltage or electromotive force is thus induced in the tag 2. This voltage is rectified and used to power the functions of the tag 2. The voltage available across the terminals of this resonator is then the product of the voltage induced by the overvoltage coefficient (corresponding overall to the coefficient of quality of the resonator) thus allowing the energizing of an integrated circuit of the tag 2. The remote energizing of the integrated circuit of the tag 2 requires a minimum voltage in order to operate, typically of the order of a few volts peak. There thus exists a minimum magnetic field value applied to the antenna of the tag 2 upward of which the tag is functional and can respond to the demands of the reader.

Design guidelines for RFID systems of inductive type are defined in particular in the standards ISO 15693, ISO 18000-3 and ISO 14443. These standards fix in particular the frequency of the carrier of the signal at 13.56 MHz. To allow the transmission of data from the tag 2 to the RFID reader 1, the tag modifies in a manner known per se the impedance that it exhibits across the terminals of the antenna circuit. This impedance variation is detected by the reader on account of the inductive coupling. The reader 1 is thus configured to detect a response or an absence of response from the tag 2.

During location of the tag 2, the reader 1 seeks periodically to detect a response from the tag 2. At regular intervals, the radiofrequency field of the reader 1 is activated by exciting its antenna with a sinusoidal voltage at its resonant frequency for a predetermined duration. For the duration of the activation, the reader emits several requests in a recurrent manner according to a standardized protocol. Subsequent to these requests, the reader 1 keeps its field activated to detect an optional response from the tag 2.

Figure 4:
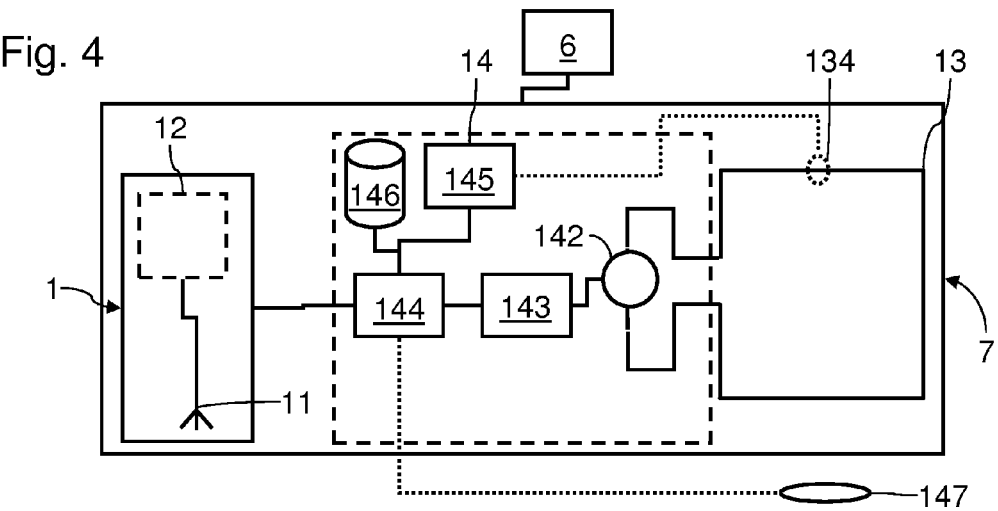
FIG. 4 is a block diagram of a locating device according to an embodiment of the invention.

FIG. 4 is a block diagram of a device 7 for locating an RFID tag, according to an embodiment of the invention. The device 7 includes a reader 1 such as illustrated in FIG. 1, the antenna 13 and a supervision circuit 14.

The antenna 13 is of the inductive coupling type. The antenna 13 is advantageously optimized for operation on the surface of the ground (with a weak ground effect). The antenna 13 may be of any appropriate type, for example such as described in document FR2961354. The antenna exhibits substantially a rectangular or circular loop shape. The antenna 13 is advantageously furnished with a current probe 134.

The supervision circuit 14 comprises a power supply 142 connected to the terminals of the antenna 13. A control circuit 143 defines the electrical power applied by the power supply 142 to the antenna circuit 13, and consequently the amplitude of the electromagnetic field generated by this antenna circuit. The supervision circuit 14 also comprises a processing circuit 144 and a measuring circuit 145. The measuring circuit 145 recovers the measurements of the current probe 134. Although the functions of the circuits 143, 144 and 145 are illustrated independently, several of these functions may of course be implemented by a single integrated circuit. The device 7 furthermore comprises a memory 146.

The device 7 comprises a sensor 147 of the distance between the antenna 13 and the interface 5 between the two media, in this instance a sensor indicating the distance ze between the antenna 13 and the ground 5. Such a sensor 147 is known per se and may be an optical sensor (for example based on a laser beam), acoustic sensor (for example of sonar type) or radio sensor (of radar type). The device 7 can also be furnished with a level allowing the operative to verify the horizontally of the antenna 13 during location. The sensor 147 is connected to the processing circuit 144. The device 7 includes or is connected to a display 6 providing in particular the value of the distance zp to the operative, and, if appropriate, instructions to be executed by the operative.

As an alternative, the device 7 may be devoid of any sensor for measuring the distance ze between the antenna 13 and the ground 5. The device 7 can then determine this distance ze by other means. The device 7 may for example request the operative to place the device 7 a given distance from the ground by way of the display 6. The operative can then place the device 7 at the requested distance, by interposing for example calibrated thickness wedges between the device 7 and the ground 5, or by using a tripod with adjustable height on which the device 7 can be fixed and comprising graduations indicating the distance between the device 7 and the ground 5 for a given adjustment. The user will be able to confirm that the device 7 is at the right distance by pressing an appropriate button, so that the device 7 can determine that it is positioned at the requested distance from the ground 5.

The device 7 advantageously comprises a sensor of the field level on the antenna 13. Such a sensor makes it possible to chart the effective level of the electromagnetic field produced by the antenna 13 so as to be able to take account of possible fluctuations of the impedance of this antenna 13 and of the power level provided by the power supply 142 on this antenna 13. As in the example illustrated, this sensor can be implemented in the form of a current probe 134 measuring the current passing through the antenna 13.

The principle of the location of the tag 2 by the device 7 according to the invention relies on the property that the tag 2 becomes functional and emits a response upward of an electromagnetic field threshold (for an angular frequency w) applied to its antenna ($H_s$). This threshold is an average value, applied perpendicularly to the surface of the antenna of the tag 2, which generates a sufficient induced voltage (e.m.f) in this antenna circuit such that a circuit 22 of the tag is powered by a minimum voltage Vps rendering it functional, having regard to the transfer function of the equivalent resonator (characterized by a quality factor Q and a tuning angular frequency $\omega 0$).

$$V_{ps} \approx \cdot \frac{-Q \cdot \frac{\omega_o}{\omega}}{\left(1 + j \cdot Q \cdot \left(\frac{\omega}{\omega_o} - \frac{\omega_o}{\omega}\right)\right)} \cdot e.m.f =$$

$$\frac{-Q \cdot \frac{\omega_o}{\omega}}{\left(1 + j \cdot Q \cdot \left(\frac{\omega}{\omega_o} - \frac{\omega_o}{\omega}\right)\right)} \cdot (\mu_o \cdot \omega \cdot S \cdot H_s)$$

S is the section of the antenna circuit of the tag 2 traversed by the electromagnetic flux.

By way of example, this voltage Vps is typically of the order of a few volts r.m.s. The value $H_s$ is typically of the order of a few tens to a few hundred mA/m r.m.s, as a function of the characteristics of the antenna of the tag.

Subsequently, it will be assumed that this value $H_s$ of the electromagnetic field is constant throughout the process of locating the tag 2, without however requiring that it be known in advance.

During a first phase, one determines the plumb alignment of the tag 2 at the surface 5. When a tag 2 is correctly oriented (plane of its antenna horizontal) and when the latter is not disturbed by a conducting object of large dimensions in the ground 4, the zone of detection of the tag 2 is generally an ellipse.

To implement this phase, the control circuit 143 can control the initial application of a high or maximum power by the power supply 142. As soon as the processing circuit 144 detects a response from the tag 2, it determines that the antenna 13 is situated in the zone of detection of the tag 2 for this power. This item of information can be fed back to the operative by way of the display 6. The control circuit 143 thereafter controls the application of a lower power level and indicates to the operative that a more accurate investigation of the plumb alignment is in progress. The operative is prompted to displace the device 7 horizontally until it is placed in a more restricted zone of detection of the tag 2. As soon as the processing circuit 144 detects a response from the tag 2 for the lower power, it determines that the antenna 13 is situated in the zone of detection of the tag 2 and provides this item of information to the operative. By repeating these phases of power decrease, the device 7 can reduce the zone of detection of the tag 2 to a relatively restricted area of ground surface (typically of 50×50 mm). The processing circuit 144 stores the minimum value P0 for which it still detects a response from the tag 2. The plumb alignment of the tag 2 can thus be determined with high accuracy, furthermore without requiring calculations.

During a second phase, the distance zp of the tag 2 from the ground 5 is determined at this plumb alignment, by determining the minimum emission power of the antenna 13 for which the tag 2 is detected, for various distances ze of the device 7 above the plumb alignment of the tag 2.

According to a first variant, the operative is assumed to lay the antenna 13 on the ground 5 (a directive can be provided to him or her for this purpose by way of the display 6) at the plumb alignment determined for the tag 2 for a first series of measurements. Next the operative is invited to raise the antenna 13 to various distances ze above the ground for several new series of measurements. The processing circuit 144 can for example invite the operative to raise the antenna 13 by increments of 50 mm, for example by way of the display 6. The processing circuit 144 can invite the operative to raise the antenna and indicate to him or her to keep this antenna 13 at this distance ze for the duration of the measurement, the processing circuit 144 determining this distance of the antenna 13 by way of the sensor 147 or by validation of this distance by the user by way of an appropriate interface.

For various distances ze, the control circuit 143 thus controls the application of various powers by the power supply 142 on the antenna 13, these various powers being greater than the stored value P0. The various power values can be applied in the form of repetitive sequences of requests/responses defined in an RFID communication protocol. For each distance ze, the processing circuit 144 determines the minimum power of the power supply 142 for which a response from the tag 2 is obtained, by noting that upward of a certain power, no response is obtained from the tag 2.

For each of the distances ze measured, the processing circuit 144 stores an electromagnetic field value measured on the antenna 13 for this minimum power. For each of the measured distances ze, the processing circuit 144 thus stores a measurement in the memory 146, in the form of a pair Ek=(zek; $H_k$), k being the index of a measurement, zek being the value of the corresponding distance ze, and $H_k$ being the amplitude of the field on the antenna 13, measured at this distance zek for the minimum detection power.

According to a second variant, the operative is assumed to lay the antenna 13 on the ground 5 (a directive can be provided to him or her for this purpose by way of the display 6) at the plumb alignment determined for the tag 2. The processing circuit 144 then launches a repetitive sequence of requests/responses so as to determine the detection limit distance ze at various power levels. The operative is invited to perform a slow manipulation of lifting the antenna up to a distance d, with dmin<d, dmin being fixed by the desired accuracy of estimation of the distance between the tag 2 and the ground 5.

In this variant, the power applied by the power supply 142 to the antenna 13 starts at a value at least equal to the stored value P0 and is then increased to various discrete levels. When the operative raises the antenna 13, the processing circuit 144 determines the distance zek up to which the power Pk applied to the antenna makes it possible to obtain a response from the tag 2. When a break in detection of the tag 2 is determined, the power of the power supply 142 is incremented to $P_{k+1}$ so as to determine the distance $ze_{k+1}$.

For each of the limit distances zek determined, the processing circuit 144 thus stores a measurement in the memory 146, in the form of a pair Ek=(zek; $H_k$).

To confirm each detection limit distance zek, a detection limit distance can be invalidated: when a limit distance is identified, the investigation sequence is continued transiently with the same power so as to verify that the tag 2 is not detected at a greater distance ze. A limit distance zek will be validated if it is not followed by another detection distance ze which is greater for this power.

According to a third variant, the operative is assumed to lay the antenna 13 on the ground 5 at the plumb alignment determined by the tag 2. The processing circuit 144 then launches a repetitive sequence of questions/responses so as to determine the detection limit distance ze at various power levels. The operative is invited to perform a slow manipulation of lifting the antenna up to a distance d, with dmin<d, dmin being fixed by the desired accuracy of estimation of the distance zp between the tag 2 and the ground 5.

In this variant, the power applied by the power supply 142 to the antenna 13 starts at a value at least equal to the stored value P0. When the antenna 13 is raised with this power level and when several requests/responses culminate in a non-detection of the tag 2, the control circuit 143 instructs the application of an ascending power ramp.

For each of the limit distances ze determined during an ascending power ramp, the processing circuit 144 thus stores a measurement in the memory 146, in the form of a pair Fk=(zek; $H_k$).

If several successive requests/responses culminate in a detection of the tag 2, the control circuit 143 instructs the application of a descending power ramp. During the application of a descending power ramp, the processing circuit 144 determines a limit distance ze and a limit power corresponding to a limit of detection of the tag 2. When a limit distance ze and a limit power are determined, a new ascending power ramp is applied to the antenna 13 again.

In order to confirm that the measured power and the measured distance do indeed correspond to a detection limit, the descending ramp is continued transiently to verify that a new detection does not occur for a lower power and a greater distance ze.

For each of the limit distances ze determined during a descending power ramp, the processing circuit 144 thus stores a measurement in the memory 146, in the form of a pair Ek=(zek; $H_k$).

The rate of the ascending and descending ramps will be sufficiently fast such that the elevation movement of the antenna 13 cannot counteract the decrease in the amplitude of the field of the tag 2 at the level of this antenna 13.

The distinction between the measurements Ek and Fk makes it possible to take account of detection thresholds that are potentially slightly different when passing from a detection state to a non-detection state as compared with passing from a non-detection state to a detection state (hysteresis phenomenon in respect of the thresholds). A first calculation of the distance zp will then be able to be carried out on the basis of the measurements Ek and a second calculation of the distance zp will be able to be carried out on the basis of the measurements Fk. The distance zp adopted will be able to be the average of the values obtained by these two calculations.

For these variants, the maximum distance of elevation of the antenna 13 can be fixed either by an ergonomic value (for example 400 or 500 mm above the ground), or by a distance for which the field generated by the antenna 13 is no longer sufficient to detect a response from the tag 2.

Advantageously, the power level provided by the power supply 142 is slaved to a value of current passing through the antenna 13 and measured by the current probe 134. The power supply 142 can be instructed by the control 143 to apply discrete power values to the antenna 13. These powers may for example follow a quadratic progression (for example with the following values in watts: [0.5, 1, 1.5, 2, 3, 4, 5, 6, 7.5, 9, 10.5, 12] or the following values: [0.5, 1, 1.5, 2, 2.5, 3, 3.5, 4, 4.5, 5, 5.5, 6, 6.5, 7.5, 8, 9, 9.5, 10.5, 11, 12] or else the following values: [0.5, 0.75, 1, 1.25, 1.5, 1.75, 2.25, 2.5, 3, 3.5, 4, 4.5, 5, 5.5, 6.25, 6.75, 7.5, 8.25, 9, 9.75, 10.5, 11.25, 12.25]) so as to have a radiofrequency field generated by the antenna 13 that is substantially linear.

Location of the tag can comprise a preliminary step of establishing a communication with a tag (inventory mode). The location of the tag can thereafter be implemented with the aid of the identifier of this tag (addressed mode for example).

Based on the interrogation of a tag 2 by means of its identification so as to obtain its detection, it is possible to carry out a detection of this tag even if the response measured by the measuring circuit 145 is strongly degraded. It is thus possible to limit to the maximum the cases where the emission power of the antenna 13 is sufficient to obtain a response from the tag 2, without the response from this tag being detected by the reader. Such a mode of detection turns out to be advantageous, particularly in a noisy environment where the response from the tag received on the antenna 13 can be strongly disturbed.

By interrogating a tag 2 beforehand, the content of the response frame of the tag 2 is known, it being possible for the latter to be defined in a communication standard known in advance. It is for example possible to perform a calculation for the correlation between the response frame expected and the response measured by the measuring circuit 145 and identified by the processing circuit 144. The processing circuit 144 may for example determine that the tag is detected if the correlation value calculated attains a predefined threshold. Consequently, even if the response measured for the tag 2 is marred by errors (for example if the cyclic redundancy test is erroneous), it is nonetheless possible to regard the tag 2 as having responded and therefore of having been detected.

An exemplary determination of the distance zp will be given in a particular case for a high-frequency electromagnetic field. A communication frequency of 13.56 MHz, whose wavelength in vacuo is about 22 m, is taken as assumption. In moist ground, this wavelength will be divided by about 5, i.e. a wavelength of about 4 m. The conventional expressions for static magnetic fields can therefore be used with a reasonable approximation. Furthermore, it is assumed that the magnetic field generated by the antenna 13 is not disturbed by the presence of the ground.

With this simplified modeling, the field H applied to the tag 2 is expressed by the following relation:

$$H = \frac{I_{ant}}{2R_{ant}} \cdot \frac{1}{\left(1 + \left(\frac{z}{R_{ant}}\right)^2\right)^{3/2}} = H_0 \cdot \frac{1}{\left(1 + \left(\frac{z}{R_{ant}}\right)^2\right)^{3/2}}$$

With $H_0$ the magnetic field produced by the device 7 at the antenna 13 sound center, $R_{ant}$ the radius of this antenna in the case of a circular shape, and with z the total distance between the center of this antenna and the center of the tag 2, i.e. z=(ze+zp).

The limit distance $ze_{lim}$, of passage between the detection of the tag and its non-detection during an elevation of the antenna of the device 7 is connected with the high-frequency level of the antenna 13, characterized for example by the field $H_0$ produced by the antenna 13 at its center. The electromagnetic field threshold for activating the tag is then expressed by the following relation:

$$H_s = H_0 \cdot \frac{1}{\left(1 + \left(\frac{(zp + ze_{lim})}{R_{ant}}\right)^2\right)^{3/2}}$$

It is thus possible to plot the field level $H_0$ as a function of the limit elevation $ze_{lim}$, and thus by way of example to place measurement points $\{H_k, dk\}$, by means of the following relation.

$$H_k = H \cdot \left(1 + \left(\frac{(zp + zek)}{R_{ant}}\right)^2\right)^{3/2}$$

Figure 5:
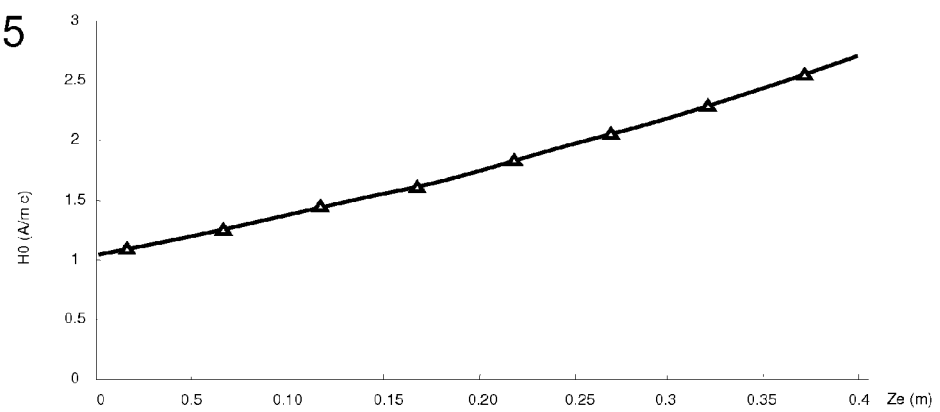
FIG. 5 is a diagram of an electromagnetic field level generated by an antenna for various detection limit distances.

A corresponding curve can be plotted by a least squares procedure. The values obtained by such a procedure on the parameters $H_s$ and zp may turn out to be insufficiently accurate but nevertheless make it possible to determine the quality of the measurements through the deviation of the measurement points with respect to this curve. FIG. 5 illustrates such a diagram with tiers of field levels $H_0$ in increments of 0.2 mA/m c upward of 1.1 mA/m c.

Figure 6:
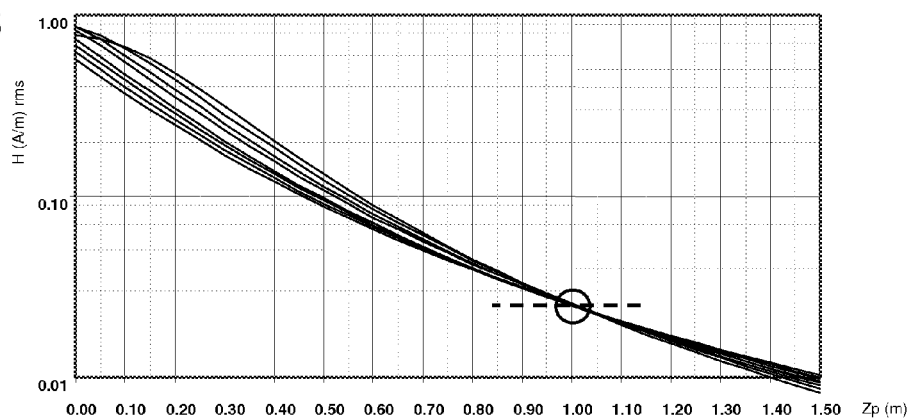
FIG. 6 is a diagram illustrating various curves of electromagnetic field at the level of the tag as a function of the distance of the tag from an interface.

For each measurement pair or point of the example hereinabove (the 8 pairs of values $\{H_k, dk\}$), it is possible to seek to estimate the magnetic field produced by the antenna 13 in the ground 4 from the surface 5 to a sufficient distance (for example 1.5 m) when this antenna 13 is placed at a distance ze=dk and with a current in its antenna circuit such that the field that it produces at the center of its antenna is $H_0=H_k$. A network of curves is thus obtained which cross at a point which corresponds to the distance sought under the ground 5, with a field value at this point which corresponds to the field threshold of the tag 2, as illustrated in FIG. 6.

On this base, the method for determining the distance zp can be as follows. A model of the field generated by the antenna 13 at a certain distance plumb with this antenna can be established with the following relation:

$$H = H_k \cdot \frac{1}{\left(1 + \left(\frac{(zp + zek)}{R_{ant}}\right)^2\right)^{3/2}}$$

On the basis of the measurements stored in the memory 146, abnormal measurements are optionally initially rejected. Accordingly, the measurements departing too far from the model provided for example by the diagram of FIG. 5 are eliminated. If too large a number of measurements depart from the model, the processing circuit 144 can decide that the estimation of the distance between the tag 2 and the ground 5 is uncertain and request a repeat of the measurement by the operative.

For each detection limit measurement stored, an estimation is calculated of the electromagnetic field generated in the ground by the device 7 when its antenna is positioned at the distance zek stored in the memory 146. A model of the distribution of the field generated by the antenna of the device 7 is relied on for this purpose. It is also possible to envisage storing reference electromagnetic field profiles and extrapolating the distribution of the electromagnetic field sought for the various measurements by interpolation between the stored profiles. As illustrated in FIG. 6, it is possible to determine the distributions of the field of the antenna of the device 7 vertically in line with the tag 2 for the various measurements. For each measurement, a diagram of the field at the level of the tag 2 is established as a function of the distance with respect to the surface. The distance zp is determined by determining the distance indicated by the intersection between several of these diagrams. In practice, a number of intersections equal to $N*(N-1)/2$ is available, with N the number of diagrams or of measurements stored. A single intersection will be able to be determined by interpolation between the multiple intersections calculated, by eliminating if need be certain intersections exhibiting too large a dispersion with respect to the others.

Such a mode of determination of the distance zp is advantageously independent of the performance of the tag 2 (quality factor and tuning frequency of its antenna) and of their evolution over time as a function of aging or of changes in the conditions of the ground or climate.

The use of high communication frequencies (lying between 3 and 30 MHz) makes it possible to obtain location times that are particularly reduced, and therefore particularly worthwhile for the operative of the device. A reduced duration of location is furthermore advantageous for the accuracy of the measurements, because the movements of the operative over a reduced measurement duration will also be relatively limited. Such a span of frequencies overcomes a usual technical prejudice according to which it would be inappropriate for satisfactory propagation in a medium such as earth or water.

In the example illustrated, a measurement of the current passing through the antenna 13 is used as parameter representative of the field generated by this antenna. Any other representative parameter may also be used, for example by means of a magnetometer measuring the field generated at the level of the antenna 13.

The invention claimed is:

1. A locating device for determining a distance (zp) of an RFID tag with respect to an interface between two media, the RFID tag being disposed on a side opposite from the locating device with respect to the interface, the locating device comprising:
    an antenna of the inductive coupling type;
    a sensor device for determining a distance (ze) between the antenna and the interface;
    an energizing circuit configured to energize the antenna so that the antenna generates an electromagnetic field with various successive amplitude values;
    a detection device for detecting an electromagnetic field response from the RFID tag;
    a processing circuit configured to:
        determine several pairs of information, each pair including:
            a distance (ze) determined between the antenna and the interface; and
            a minimum electromagnetic field value detected by the detection device from the RFID tag at the determined distance (ze) between the antenna and the interface;
        evaluate the distance between the RFID tag and the interface as a function of the several pairs determined.

2. The locating device as claimed in claim 1, further comprising a memory containing normalized relations between a distance (zp) of the RFID tag from the interface, and the electromagnetic field generated by the antenna at said distance (zp) from the interface, the processing circuit being further configured to evaluate the distance (zp) between the tag and the interface on the basis of said stored relations and said minimum determined values of electromagnetic field.

3. The locating device as claimed in claim 1, in which the processing circuit is configured to:
    determine, for several of said pairs of information, a relation between a distance (zp) of the RFID tag from the interface, and the electromagnetic field generated by the antenna at this distance from the interface;
    evaluate the distance (zp) between the RFID tag and the interface as corresponding to an intersection between several determined relations.

4. The locating device as claimed in claim 3, in which the processing circuit is configured to generate said relation for at least three of said pairs of information and to evaluate the distance (zp) between the RFID tag and the interface by interpolation between the intersections between said relations.

5. The locating device as claimed in claim 1, comprising a sensor for measuring a current passing through the antenna, the processing circuit being configured to determine the electromagnetic field generated at the level of the antenna as a function of the measured current.

6. The locating device as claimed in claim 1, in which the processing circuit is configured to determine each of said pairs of information by instructing the generation of several values of magnetic field for one and the same distance determined between the antenna and the interface, and by retaining for each pair the lowest magnetic field value inducing the detection of the RFID tag for the corresponding determined distance between the antenna and the interface.

7. The locating device as claimed in claim 1, in which the processing circuit is configured to determine each of said pairs of information by instructing the generation of one and the same magnetic field value for various distances determined between the antenna and the interface, and by retaining for each pair the maximum distance value inducing the detection of the RFID tag for the corresponding magnetic field value.

8. The locating device as claimed in claim 1, in which the processing circuit is configured to determine each of said pairs of information by instructing, during a variation of the distance between the antenna and the interface:
   when a response from the RFID tag is detected, by instructing the generation of the decreasing successive field values until the absence of response from the RFID tag is detected;
   when an absence of response from the RFID tag is detected, by instructing the generation of the increasing successive field values until a response from the RFID tag is detected.

9. The locating device as claimed in claim 6, comprising an interface for communication with the user, the processing circuit being configured to emit requests for displacement of the antenna by way of this communication interface.

10. The locating device as claimed in claim 1, in which the antenna and the energizing circuit are configured to generate an electromagnetic field exhibiting a frequency lying between 3 and 30 MHz.

11. The locating device as claimed in claim 1, in which the processing circuit comprises a location mode for determining the position of the RFID tag on the interface according to a normal to this interface, in which location mode, for one and the same distance between the antenna and the interface, the processing circuit is configured to:
   instruct the generation of one and the same magnetic field value in the absence of detection of the tag;
   instruct the reduction in the value of the magnetic field generated during a detection of the tag.

12. The locating device as claimed in claim 9, in which the processing circuit is configured to indicate a detection of the RFID tag in the location mode by way of said communication interface.

13. The locating device as claimed in claim 11, in which the processing circuit is configured to store the lowest magnetic field value for which the RFID tag is detected in the location mode.

14. The locating device as claimed in claim 13, in which the processing circuit, when it initiates the determination of said pairs of information, instructs the generation of a magnetic field corresponding to the lowest magnetic field value stored in the location mode.

15. The locating device as claimed in claim 1, in which said determining device includes a device for measuring the distance between the antenna of the device and the interface.

16. A method for locating an RFID tag with respect to an interface between two media, the RFID tag being disposed on the side opposite from an evaluating device with respect to the interface, the method comprising:
   generating an electromagnetic field with various successive amplitude values with an antenna of the inductive coupling type;
   determining the distance between the antenna and the interface during the generation of the electromagnetic field;
   detecting a response by the RFID tag from the generated electromagnetic field;
   determining several pairs of information each pair including:
      a distance ($z_e$) determined between the antenna and the interface; and
      a minimum electromagnetic field value response from the RDIF tag detected at the determined distance between the antenna and the interface;
   evaluating the distance between the RFID tag and the interface as a function of the pairs of information determined.

17. The method for locating an RFID tag as claimed in claim 16, in which said step of determining the distance ($z_e$) between the antenna and the interface is performed by a measurement of the distance between the antenna and the interface.

* * * * *